(12) United States Patent
Fiddes et al.

(10) Patent No.: US 12,678,875 B2
(45) Date of Patent: Jul. 14, 2026

(54) TAP AND DIE HANDLE ASSEMBLY

(71) Applicant: MILWAUKEE ELECTRIC TOOL CORPORATION, Brookfield, WI (US)

(72) Inventors: Matthew J. Fiddes, Milwaukee, WI (US); Benjamin L. Miller, Milwaukee, WI (US); Katherine J. Haim, Hartland, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 507 days.

(21) Appl. No.: 18/136,659

(22) Filed: Apr. 19, 2023

(65) Prior Publication Data

US 2023/0339030 A1    Oct. 26, 2023

Related U.S. Application Data

(60) Provisional application No. 63/334,227, filed on Apr. 25, 2022.

(51) Int. Cl.
B23G 1/26        (2006.01)
B25G 3/18        (2006.01)

(52) U.S. Cl.
CPC ............... B23G 1/261 (2013.01); B25G 3/18 (2013.01)

(58) Field of Classification Search
CPC .......... B23G 1/261; B25G 1/002; B25G 3/18; B23B 31/10741
See application file for complete search history.

(56) References Cited

U.S. PATENT DOCUMENTS

| | | | |
|---|---|---|---|
| 2,826,950 A | * | 3/1958 | Mcclintock ............ B23G 1/261 |
| | | | 279/144 |
| 3,004,270 A | | 10/1961 | Cowley |
| 3,715,168 A | | 2/1973 | Kuhn |
| 3,811,145 A | | 5/1974 | Fink |
| 4,097,182 A | | 6/1978 | Rolnick |
| 4,111,591 A | | 9/1978 | Rolnick |
| 4,213,723 A | | 7/1980 | Wagner |
| 4,630,978 A | | 12/1986 | Keiser et al. |
| 4,752,163 A | | 6/1988 | Fedor |
| 4,969,780 A | | 11/1990 | Hermsted |
| 5,203,652 A | | 4/1993 | Woods |
| 5,203,874 A | | 4/1993 | Azkona-Ollacarizqueta |

(Continued)

FOREIGN PATENT DOCUMENTS

| | | | |
|---|---|---|---|
| DE | 673248 C | * | 3/1939 |
| DE | 2828718 A1 | | 1/1980 |

(Continued)

*Primary Examiner* — Eric A. Gates
(74) *Attorney, Agent, or Firm* — Michael Best & Friedrich LLP

(57)        ABSTRACT

A handle assembly to receive a collet of a tap assembly or a die includes a body defining a non-circular aperture and an axis of rotation that extends through the non-circular aperture. The non-circular aperture is configured to receive the collet of the tap assembly or the die. The handle assembly also includes a grip extending radially from the body and a retainer disposed in the body. The retainer includes an engagement member and a biasing member that biases the engagement member toward the axis of rotation. The retainer is configured to releasably secure the collet of the tap assembly or the die within the non-circular aperture.

12 Claims, 11 Drawing Sheets

(56) References Cited

U.S. PATENT DOCUMENTS

| | | | |
|---|---|---|---|
| 5,299,895 | A | 4/1994 | Greenhill |
| 5,343,787 | A | 9/1994 | McDonnell |
| 6,386,804 | B1 | 5/2002 | Johnson et al. |
| 6,945,145 | B1 * | 9/2005 | Kesinger ................ B25G 1/005 |
| | | | 279/42 |
| 7,793,569 | B2 | 9/2010 | Nash et al. |
| 8,434,390 | B2 | 5/2013 | Cross et al. |
| 9,095,917 | B2 | 8/2015 | Patil et al. |
| 10,279,410 | B2 | 5/2019 | Steinfels et al. |
| 2009/0308208 | A1 | 12/2009 | Stevick |

FOREIGN PATENT DOCUMENTS

| | | | | |
|---|---|---|---|---|
| DE | 2830945 | A1 * | 1/1980 | |
| DE | 8414777 | U1 | 9/1984 | |
| DE | 8436958 | U1 | 3/1985 | |
| DE | 8601265 | U1 | 2/1986 | |
| DE | 8605582 | U1 | 7/1986 | |
| DE | 3936060 | C1 | 3/1991 | |
| DE | 202005008239 | U1 | 7/2005 | |
| JP | 2570177 | Y2 * | 5/1998 | |
| JP | H10125041 | A * | 5/1998 | |
| JP | 2002242912 | A * | 8/2002 | |
| WO | 2003035317 | A1 | 5/2003 | |

* cited by examiner

TAP AND DIE HANDLE ASSEMBLY

CROSS-REFERENCE TO RELATED APPLICATION

This application claims priority to U.S. Provisional Patent Application No. 63/334,227, filed Apr. 25, 2022, the entire contents of which are incorporated herein by reference.

FIELD OF THE INVENTION

The present disclosure relates to taps and dies and, more particularly, to a handle assembly for use with taps and dies.

SUMMARY

In one embodiment, the disclosure provides a handle assembly to receive a collet of a tap assembly or a die. The handle assembly includes a body defining a non-circular aperture and an axis of rotation that extends through the non-circular aperture. The non-circular aperture is configured to receive the collet of the tap assembly or the die. The handle assembly also includes a grip extending radially from the body and a retainer disposed in the body. The retainer includes an engagement member and a biasing member that biases the engagement member toward the axis of rotation. The retainer is configured to releasably secure the collet of the tap assembly or the die within the non-circular aperture.

In another embodiment, the disclosure provides a handle assembly to receive a collet of a tap assembly or a die. The handle assembly includes a body defining an aperture and an axis of rotation that extends through the aperture. The aperture is configured to receive the collet of the tap assembly or the die. The body has an outer perimeter. The handle assembly also includes a grip extending radially from the outer perimeter of the body and a retainer disposed in the body. The retainer includes a first end and a second end opposite the first end. The first end is movable into the aperture to releasably secure the collet of the tap assembly or the die within the aperture. Both the first end and the second end are located within the outer perimeter of the body.

In yet another embodiment, the disclosure provides a tap and die kit including a collet configured to receive a tap. The collet has an outer surface and a recess formed in the outer surface. The tap and die kit also includes a die having an outer surface and a recess formed in the outer surface. The tap and die kit further includes a handle assembly having a body defining an aperture and an axis of rotation that extends through the aperture, a grip extending radially from the body, and a retainer disposed in the body. The collet and the die are alternately received in the aperture of the handle assembly. The retainer selectively engages the recess of the collet and the recess of the die to releasably secure the collet and the die in the aperture.

Other aspects of the disclosure will become apparent by consideration of the detailed description and accompanying drawings.

DETAILED DESCRIPTION

Figure 1:
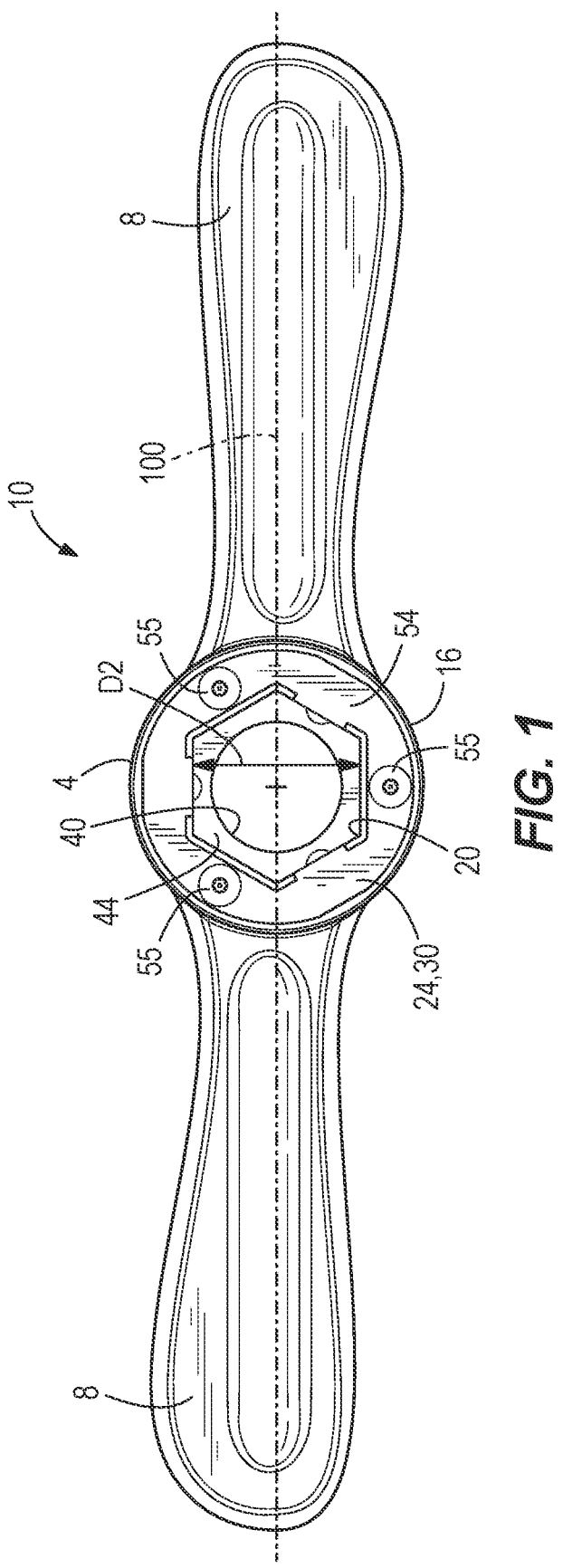
FIG. 1 is a bottom view of a handle assembly according to the embodiments disclosed herein.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting.

Figure 2:
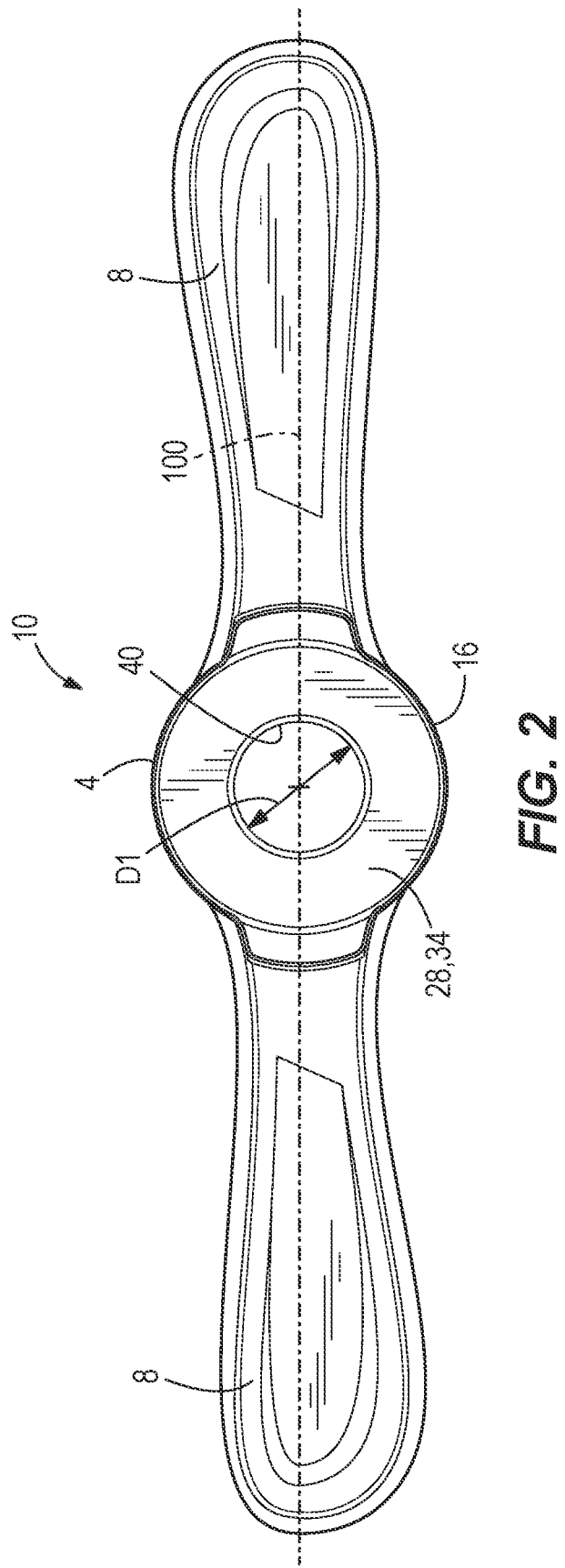
FIG. 2 is a top view of the handle assembly of FIG. 1.
Figure 3:
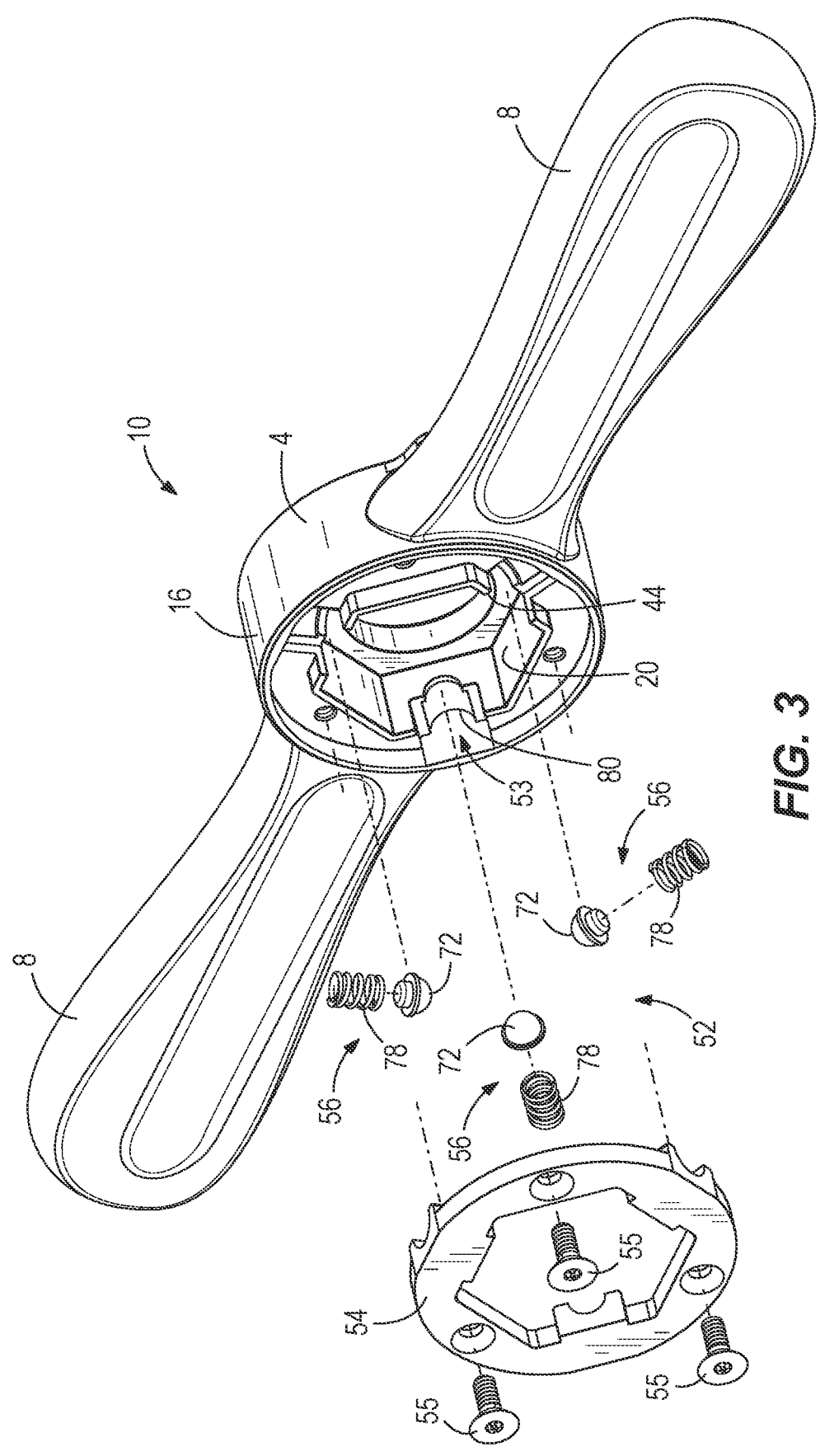
FIG. 3 is an exploded, bottom perspective view of the handle assembly of FIG. 1.

FIG. 1-3 illustrate a handle assembly 10. The handle assembly 10 is usable with a collet of a tap assembly (see, for example, FIGS. 7A-&C) and/or a die (see, for example, FIG. 6). In particular, the handle assembly 10 can alternately receive or engage a tap assembly or a die to manipulate the tap assembly or the die. The handle assembly 10 provides a structure for a user to rotate the tap assembly or the die, thereby forming threads in a bore or on a post.

The illustrated handle assembly 10 includes a body 4 and a grip 8 extending radially from the body 4. In the illustrated embodiment, the handle assembly 10 includes a pair of grips 8 opposite one another. The grips 8 provide handles for a user to manipulate (e.g., hold and/or rotate) the handle assembly 10. The grips 8 and the body 4 are aligned to define a longitudinal axis 100 of the handle assembly 10. In other embodiments, the handle assembly 10 may include fewer or more grips 8. In the illustrated embodiment, the body 4 and the grips 8 are integrally formed of a single piece. For example, the body 4 and the grip 8 may be formed of metal (e.g., steel, aluminum, zinc, etc.). In other embodiments, the body 4 and the grips 8 may be separate pieces that are secured (e.g., welded) together. In such embodiments, the body 4 and the grips 8 may be formed of different materials.

The illustrated body 4 is generally cylindrical and has an outer perimeter 16. In other embodiments, the body 4 may be other shapes. The body 4 also defines a non-circular aperture 20 that extends from a first side 24 of the body 4 toward a second side 28 of the body 4. The first side 24 may also be referred to as a bottom side, and the second side 28 may also be referred to as a top side, depending on the orientation of the handle assembly 10. The first side 24 is defined by a first, or bottom, surface 30 of the body 4. The second side 28 is defined by a second, or top, surface 34 of the body 4. The non-circular aperture 20 defines an axis of rotation 200 about which the handle assembly 10 rotates during use. The axis of rotation 200 extends through the first side 24 and the second side 28 of the body 4. The illustrated axis of rotation 200 is perpendicular to the longitudinal axis 100.

As shown in FIGS. 1 and 3, the non-circular aperture 20 has a polygonal geometry. In particular, the non-circular aperture 20 has a hexagonal geometry. In other embodiments, the non-circular aperture 20 can have other geometries, such as octagonal, triangular, square, D-shaped, oblong, irregular, and the like. As discussed below, the non-circular aperture 20 allows the body 4 to receive a die 32 (FIG. 6) and/or a collet 110 of a tap assembly 36 (FIGS. 7A-7C). The non-circular aperture 20 creates a physical interference fit with the die 32 and/or the tap assembly 36 to transmit force (e.g., rotation) from the handle assembly 10 to the die 32 and/or the tap assembly 36 during operation of the handle assembly 10.

The non-circular aperture 20 is formed as a recess in the first surface 30 of the body 4. The second surface 34 defines an opening 40 in communication with the non-circular aperture 20. The illustrated opening 40 has a circular geometry, but may alternatively have other geometries. The opening 40 has a diameter D1 (FIG. 2) that is smaller than a minimum dimension D2 (FIG. 1) of the non-circular aperture 20. The difference in diameters/dimensions D1, D2 creates a lip or shoulder 44 between the non-circular aperture 20 and the opening 40. The shoulder 44 prohibits the die 32 and/or the tap assembly 36 from being pushed entirely through the body 4 when received in the non-circular aperture 20.

Figure 4:
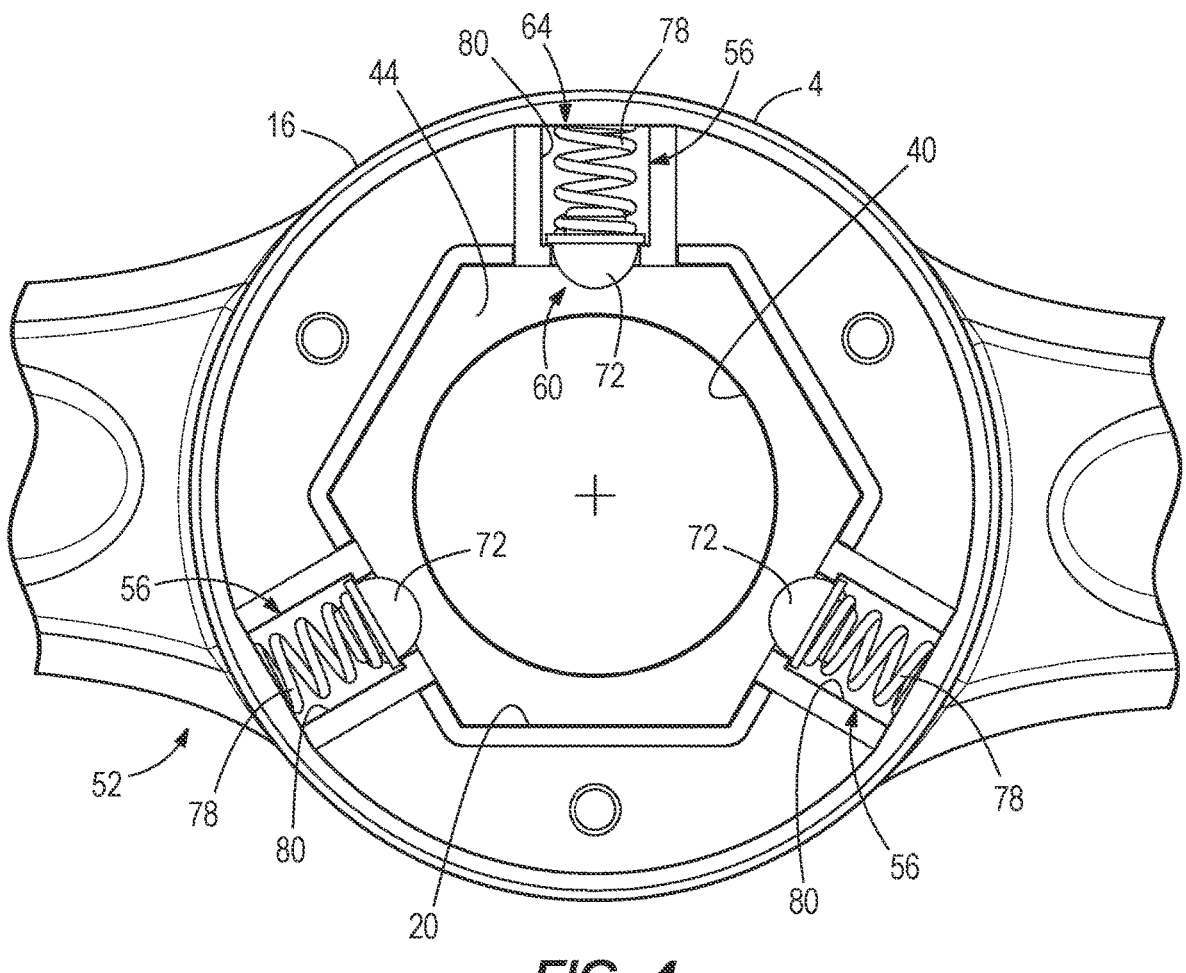
FIG. 4 is a schematic plan view of a portion of the handle assembly of FIG. 1, illustrating retainers within the handle assembly.

Referring to FIGS. 3 and 4, the handle assembly 10 includes a retaining mechanism 52. The retaining mechanism 52 is configured to selectively engage the die 32 and/or the tap assembly 36 to releasably secure the die 32 and/or the tap assembly 36 within the non-circular aperture 20. In the illustrated embodiment, the retaining mechanism 52 is supported by the body 4. More particularly, the retaining mechanism 52 is positioned within a channel 53 formed in the body 4. The channel 53 extends circumferentially around the non-circular aperture 20 and is covered by a cover 54. The illustrated cover 54 is secured to the body 4 by one or more fasteners 55 (e.g., screws) and partially defines the first surface 30 of the body 4. In other embodiments, the cover 54 may be located on the other side of the body 4 and partially define the second surface 34 of the body 4.

The retaining mechanism 52 includes at least one retainer 56. In the embodiment shown in FIGS. 3 and 4, the retaining mechanism 52 includes three retainers 56 arranged radially about the axis of rotation 200 at regular radial intervals. In the illustrated embodiment, the retainers 56 are arranged at 120 degree intervals. In other embodiments, the retaining mechanism 52 can include fewer or more than three retainers 56. In these embodiments, the retainers 56 may still be arranged at regular intervals around the axis of rotation 200 or may be arranged at irregular intervals. For example, in an embodiment with four retainers 56, the retainers 56 can be disposed at 90 degree intervals. Each of the retainers 56 is biased toward the axis of rotation 200 and imparts a force on the die 32 and/or tap assembly 36 within the body 4 to secure the die 32 and/or the tap assembly 36 within the non-circular aperture 20.

Figure 5A:
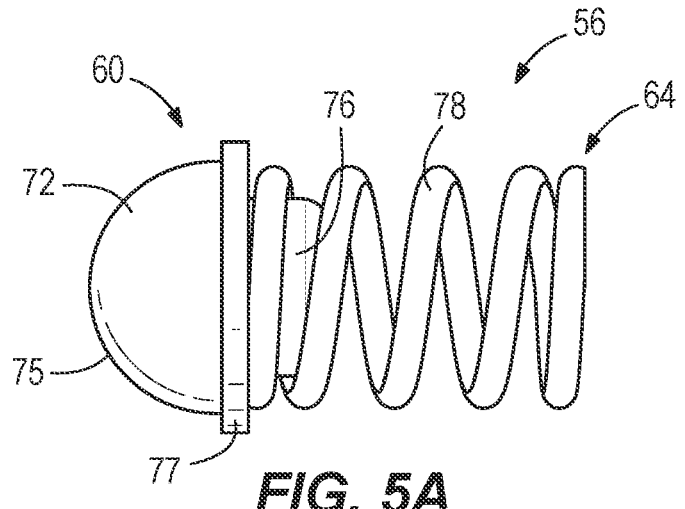
FIG. 5A is a side view of one of the retainers of FIG. 4.
Figure 5B:
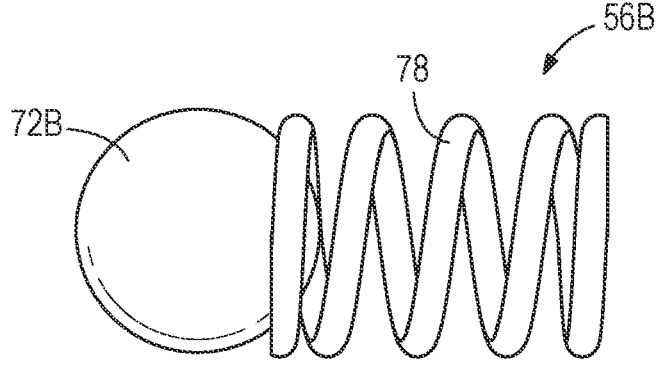
FIG. 5B is a side view of an alternative retainer for use with the handle assembly of FIG. 1.

With reference to FIG. 5A, each retainer 56 has a first end 60 and a second end 64. Each retainer 56 has an engagement member 72 defining the first end 60. The engagement member 72 may be referred to as a detent. The engagement member 72 has a head 75, an engagement post 76 extending toward the second end 64, and a flange 77 between the head 75 and the engagement post 76. The illustrated head 75 is semi-spherical. In other embodiments, the head 75 may have other shapes or configurations. For example, FIG. 5B illustrates a retainer 56B having an engagement member 72B that is spherical. Each retainer 56 also has a biasing member 78 between the first end 60 and the second end 64. The biasing members 78 in the illustrated embodiment are springs (e.g., coil compression springs). Each spring has one end supported on the engagement post 76. In other embodiments, the retainers 56 may include other suitable biasing members.

Each retainer 56 is positioned within a separate bore 80 of the channel 53 (FIG. 3). As shown in FIG. 4, the first end 60 of each retainer 56 (e.g., the head 75 of the engagement member 72) protrudes from the body 4 and into the non-circular aperture 20. The flange 77 of each retainer 56 engages a surface or wall of the body 4 to limit movement of the engagement member 72 into the non-circular aperture 20. In embodiments where the head 75B is spherical (FIG. 5B), the diameter of the head 75B may engage the wall of the body 4 to limit movement into the non-circular aperture 20. The second end 64 of each retainer 56 is also located within the outer perimeter 16 of the body such that each retainer 56 is positioned entirely within (i.e., does not extend beyond) a periphery of the body 4. The biasing member 78 biases the engagement member 72 toward the axis of rotation 200.

Figure 6:
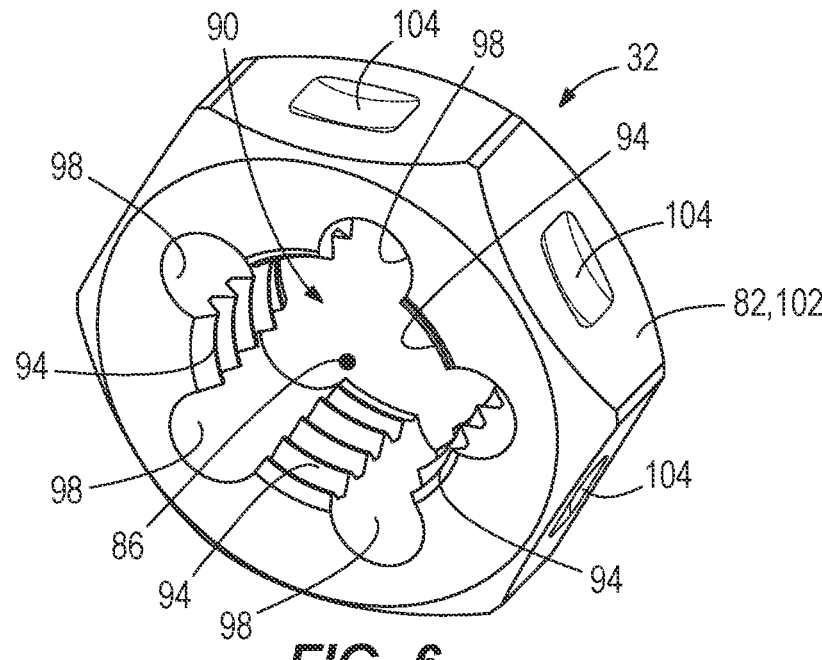
FIG. 6 is a perspective view of a die for use with the handle assembly of FIG. 1.
Figures 7A, 7B, 7C:
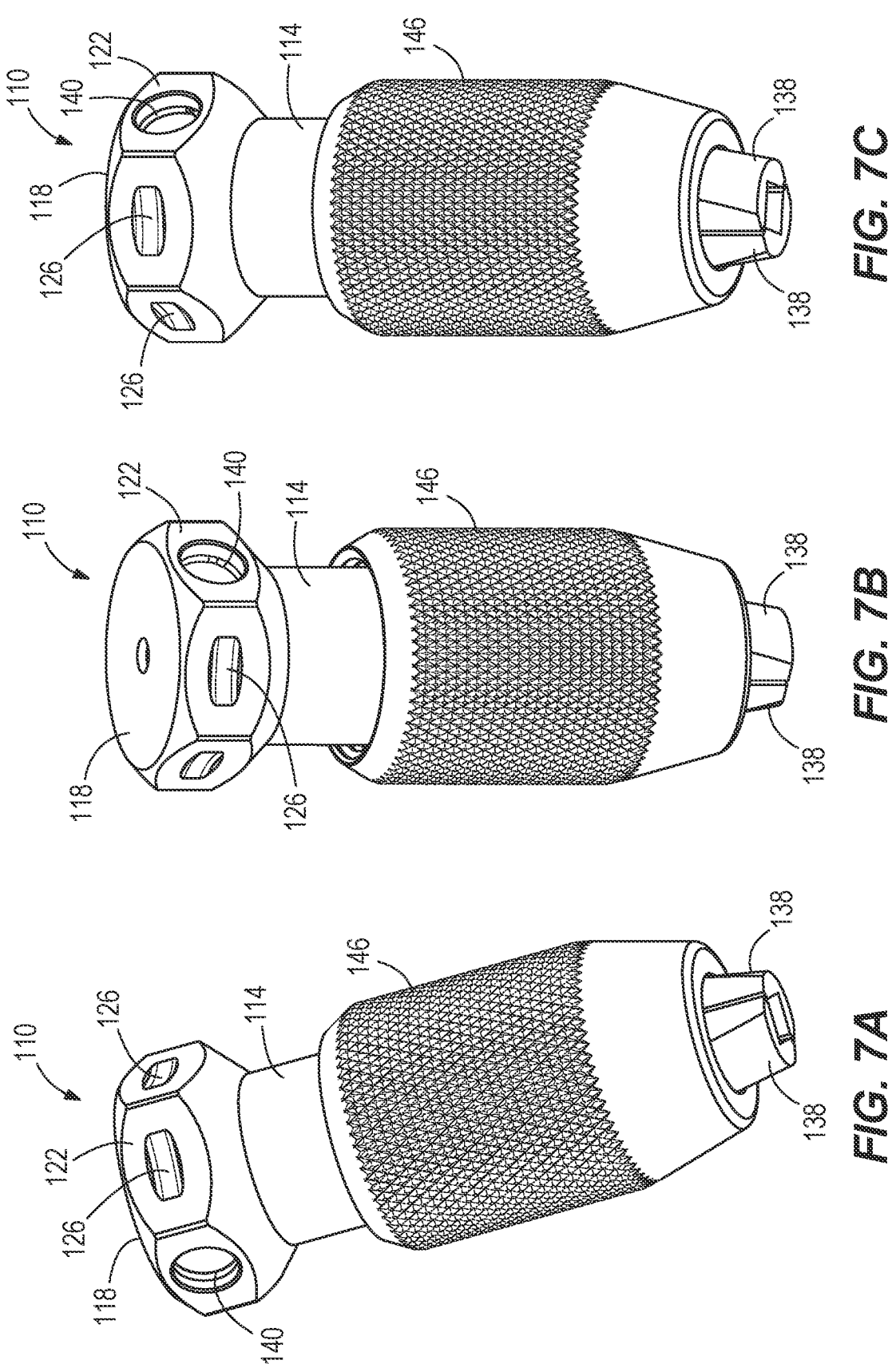
FIGS. 7A, 7B, and 7C are perspective views of a collet for use with the handle assembly of FIG. 1.
Figure 8:
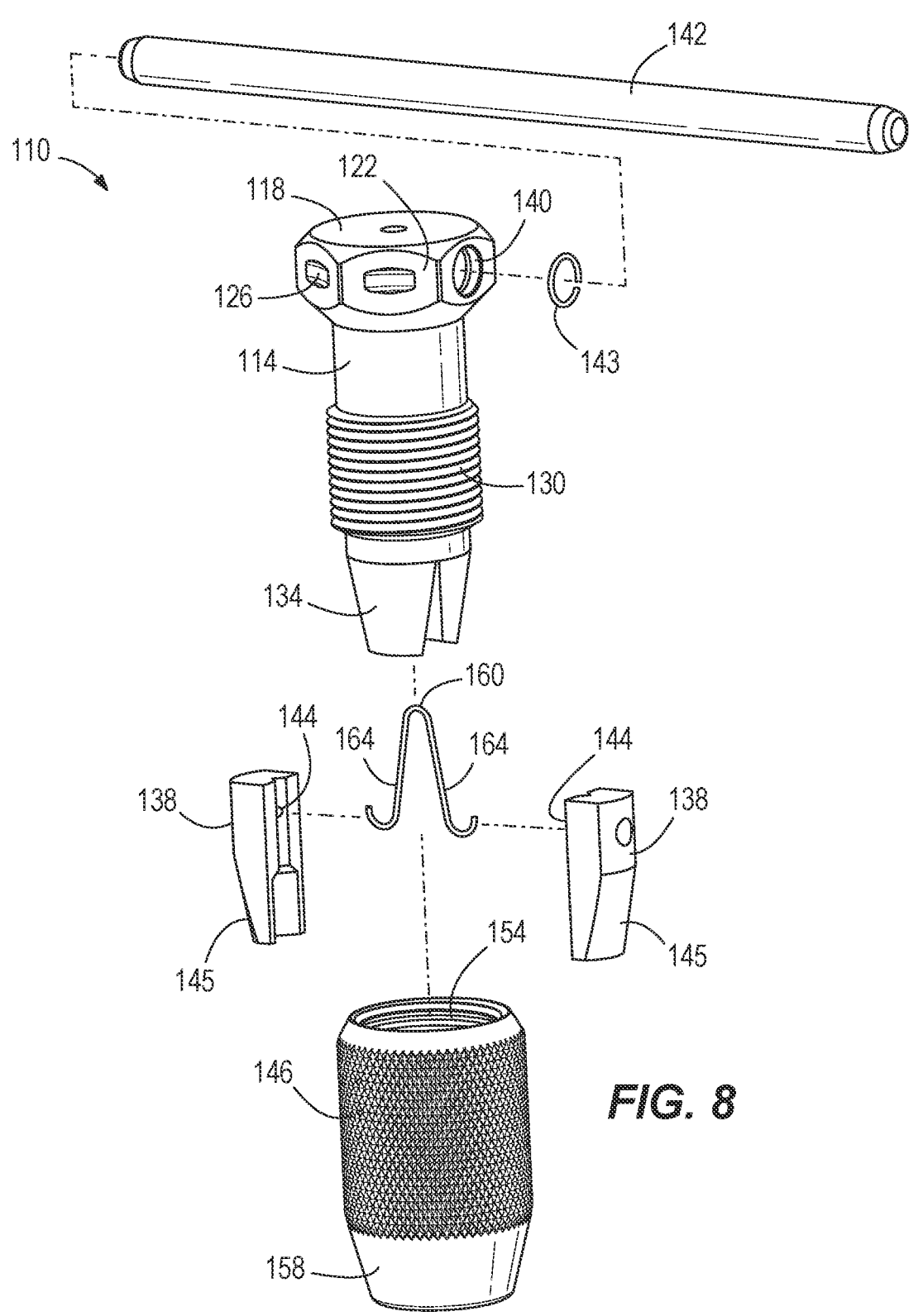
FIG. 8 is an exploded, perspective view of the collet of FIG. 7.
Figures 9A, 9B:
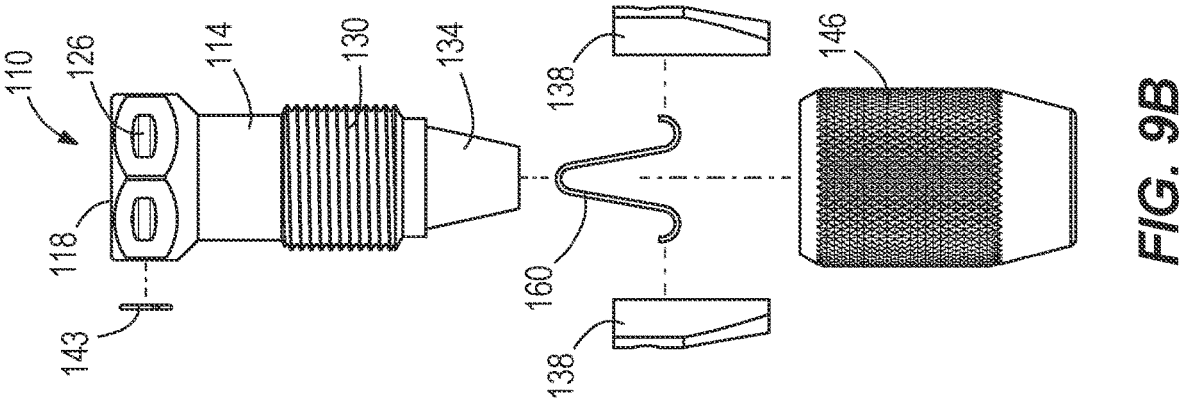
FIG. 9A is an exploded, side view of the collet of FIG. 7 with a handle rod.
FIG. 9B is an exploded, side view of the collet of FIG. 7 without the handle rod.
Figure 10B:
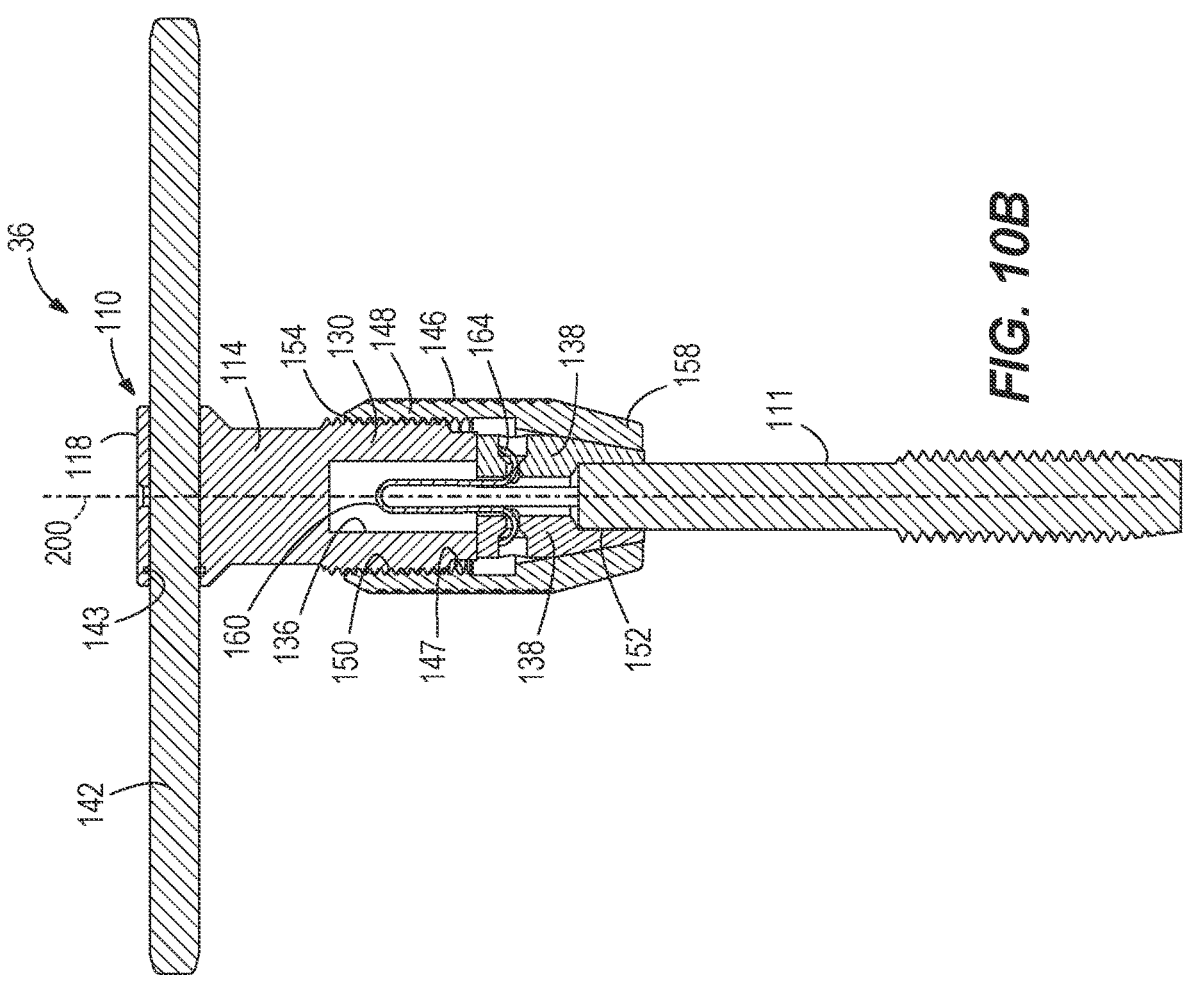
FIG. 10B is a side cross-sectional view of the collet of FIG. 7 with the relatively large tapping tool and the handle rod.
Figure 10A:
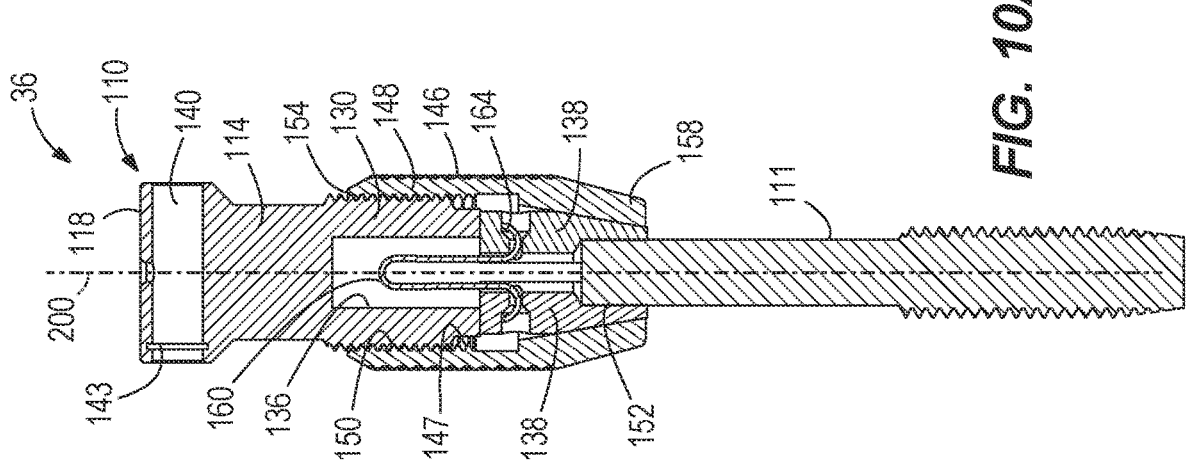
FIG. 10A is a side cross-sectional view of the collet of FIG. 7 with a relatively large tapping tool.
Figures 11A, 11B:
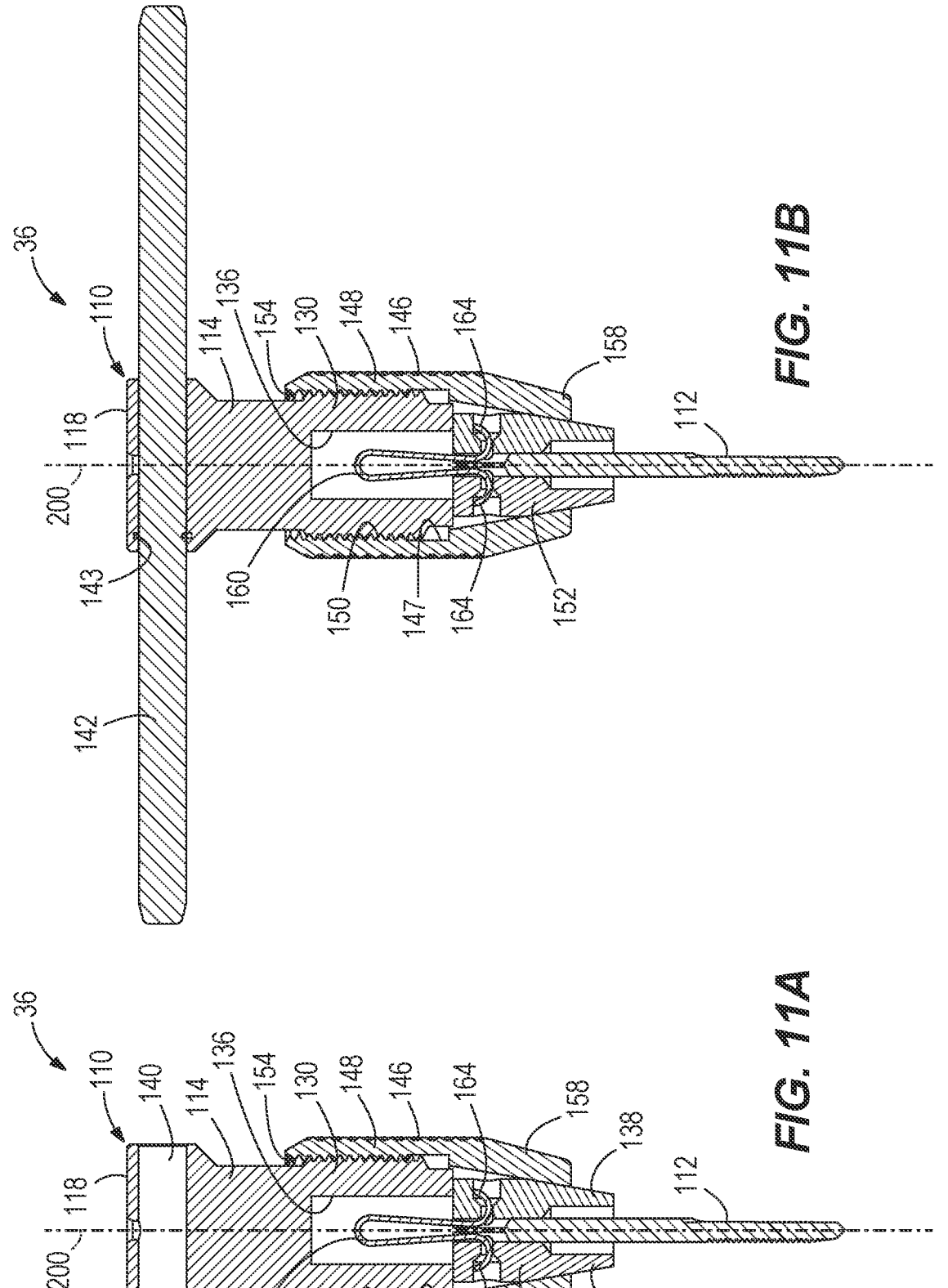
FIG. 11A is a side cross-sectional view of the collet of FIG. 7 with a relatively small tapping tool.
FIG. 11B is a side cross-sectional view of the collet of FIG. 7 with the relatively small tapping tool and the handle rod.
Figure 13:
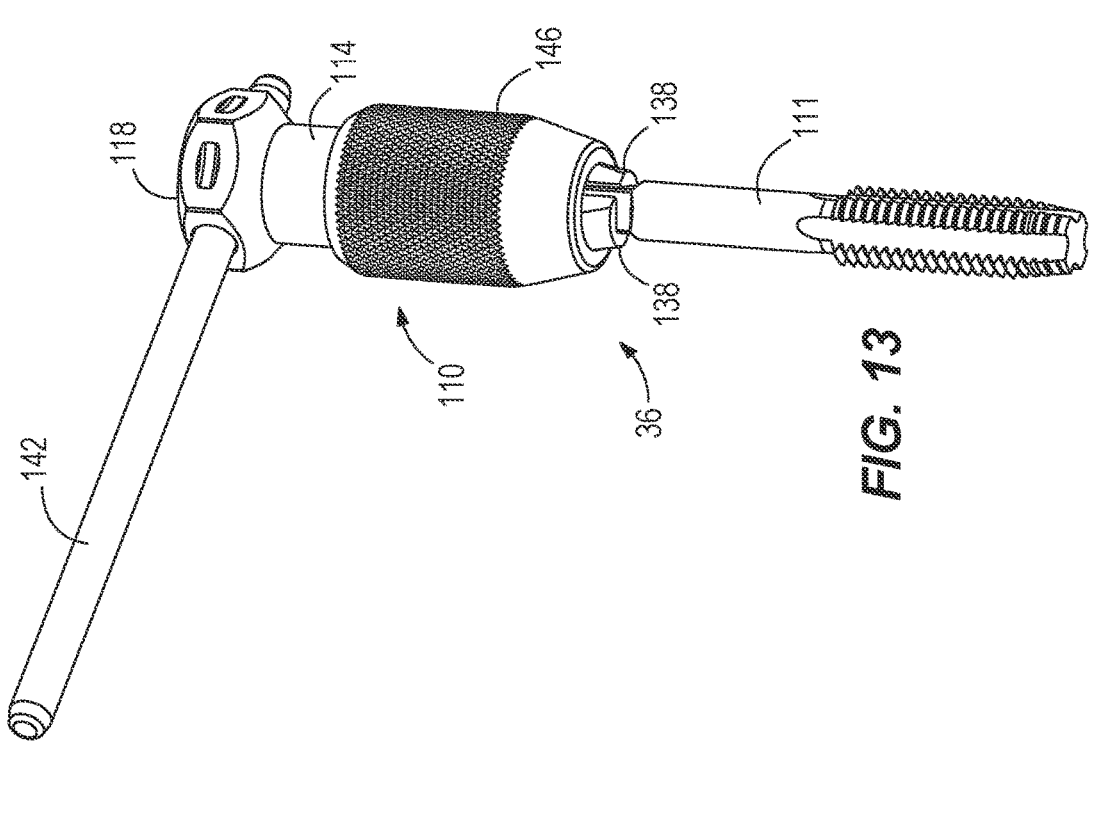
FIG. 13 is a perspective view of the handle rod attached to the collet.

FIG. 6 illustrates the die 32. The die 32 shown is one example of a die usable with the handle assembly 10. Dies having other shapes, sizes, and configurations may also be usable with the handle assembly 10. The die 32 includes an outer perimeter 82 and defines a center point 86. The outer perimeter 82 is generally the same shape as the non-circular aperture 20 of the handle assembly 10 (e.g., hexagonal) such that the die 32 can be received in the non-circular aperture 20. The die 32 has a central aperture 90 configured to receive a workpiece (not shown) and one or more cutting edges 94 surrounding the central aperture 90. The die 32 also has secondary openings 98 in communication with the central aperture 90 and separating the cutting edges 94. The secondary openings 98 provide space for cutting chips during operation of the die 32. In the illustrated embodiment, the die 32 includes five cutting edges 94 and five secondary openings 98. In other embodiments, the die 32 may include fewer or more cutting edges 94 and/or secondary openings 98.

The die 32 also has an outer surface 102 that defines the outer perimeter 82 and engages the body 4 of the handle assembly 10. In some embodiments, the outer surface 102 may have at least one receiving feature 104 that engages one of the retainers 56 (FIGS. 3-5B) of the handle assembly 10. For example, the outer surface 102 may have three receiving features 104 that engage the three retainers 56 of the illustrated handle assembly 10. Alternatively, the outer surface 102 may have six receiving features 104 (one positioned on each surface of the outer surface 102) such that three of the receiving features 104 always engage the three retainers 56 of the handle assembly 10, regardless of the orientation of the die 32 within the non-circular aperture 20. The receiving features 104 may be recesses (similar to the recesses shown in FIGS. 7A-7C) that receive parts of the retainers 56 (e.g., the heads 75 of the engagement members 72) to releasably secure the die 32 to the body 4. In the illustrated embodiment, the outer surface 102 is generally smooth or planar such that the retainers 56 engage the die 32 by a press-fit connection. When the die 32 is coupled to the body 4, the center point 86 aligns with the axis of rotation 200.

FIGS. 7A-11B illustrate the tap assembly 36. More particularly, FIGS. 7A-9B illustrate a collet 110 of the tap assembly 36, and FIGS. 10A-11B illustrate the collet 110 with different tapping tools 111, 112. The collet 110 and the tapping tools 111, 112 may collectively or individually be referred to as a "tap" or a "tap assembly." The collet 110 and the tapping tools 111, 112 shown are one example of a tap assembly usable with the handle assembly 10. Taps having other shapes, sizes, and configurations may also be usable with the handle assembly 10. For example, a tapping tool may be usable directly with the handle assembly 10 without the collet 110. Alternatively, the tap may include a different type of collet for holding the tapping tools 111, 112.

The illustrated collet 110 includes a shaft 114, a head 118, one or more jaws 138, and a collar 146. The shaft 114 includes a threaded portion 130 and a tapered end 134. The tapered end 134 is generally frustoconically-shaped. The tapered end 134 also defines a slot in which the jaws 138 are received. The shaft 114 also defines a central bore 136. The central bore 136 extends from the tapered end 134 toward the head 118.

The head 118 is coupled to an end of the shaft 114 opposite from the tapered end 134. In the illustrated embodiment, the head 118 is integrally formed as a single piece with the shaft 114. In other embodiments, the head 118 may be a separate piece that is secured to the shaft 114. The head 118 has an outer surface 122 defining an outer perimeter of the collet 110. The outer perimeter is generally the same shape as the non-circular aperture 20 of the handle assembly 10 (e.g., hexagonal) such that the collet 110 can be received in the non-circular aperture 20. The outer surface 122 has at least one receiving portion 126 that engages one of the retainers 56 (FIGS. 3-5B) of the handle assembly 10. In the illustrated embodiment, the outer surface 122 has six receiving portions 126 (one positioned on each surface of the outer surface 122) such that three of the receiving portions 16 always engage the three retainers 56 of the handle assembly 10, regardless of the orientation of the collet 110 within the non-circular aperture 20. In other embodiments, the outer surface 122 may include fewer receiving portions 126 (e.g., three receiving portions 126). In the illustrated embodiment, two of the receiving portions 126 form a through-hole 140 that extends through opposing sides of the head 118. The remaining receiving portions 126 are recesses. Any of the receiving portions 126 can receive parts of the retainers 56 (e.g., the heads 75 of the engagement members 72) to releasably secure the collet 110 to the handle assembly 10, as shown in FIG. 12.

Figure 12:
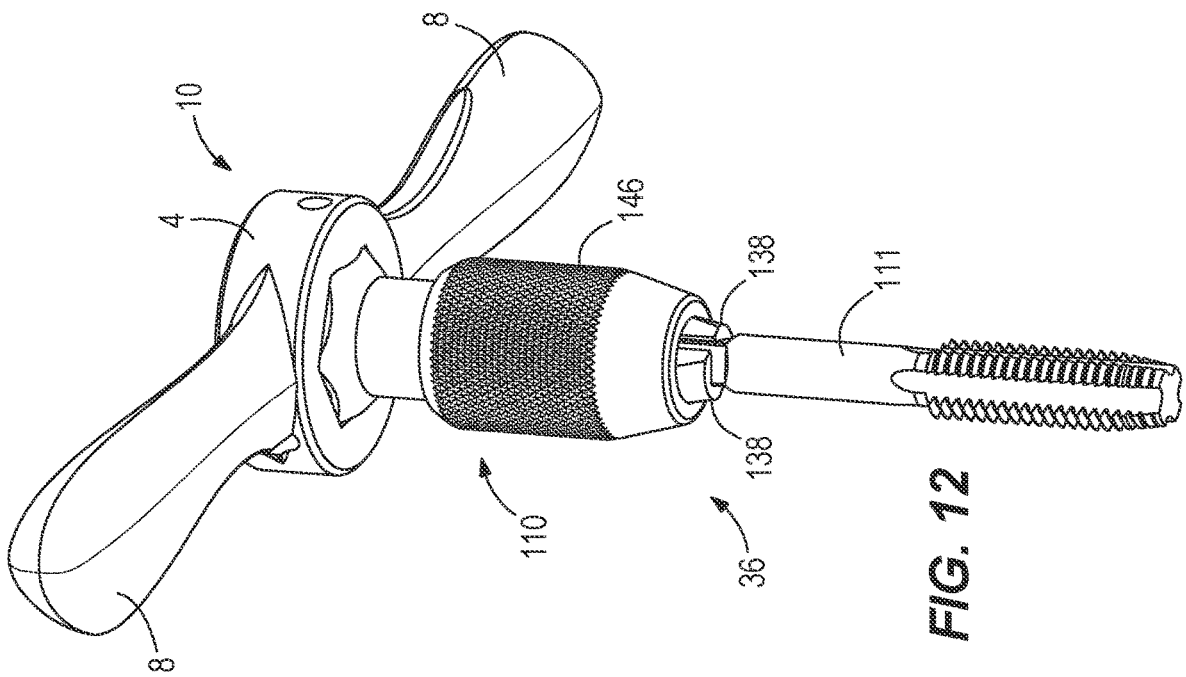
FIG. 12 is a perspective view of the handle assembly attached to the collet.

The through-hole 140 also allows a rod or dowel 142 to alternatively be coupled to the collet 110, as shown in FIG. 12. The rod or dowel 142 may be referred to as a handle rod. The rod or dowel 142 can extend through the through-hole 140 to act as a handle. A snap ring 143 is positioned within the through-hole 140 to retain the rod or dowel 142.

With reference to FIGS. 8-11B, the jaws 138 are positioned partially within the slot of the shaft 114 and extend into the collar 146. The jaws 138 are configured to grip the tapping tools 111, 112. In the illustrated embodiment, the collet 110 includes two jaws 138 positioned on diametrically opposite sides of the central bore 136. In other embodiments, the collet 110 may include fewer or more jaws 138 or may include different types of retention mechanisms. Each jaw 138 includes an inner surface 144 and an outer surface 145. The inner surfaces 144 are configured to engage the tapping tool 111, 112. At least a portion of each outer surface 145 is tapered (i.e., sloped) inwardly. A biasing member 160 engages the inner surfaces 144 to bias the jaws 138 radially outward and away from each other. In the illustrated embodiment, the biasing member 160 is a spring clip having a pair of arms 164 that engage the jaws 138 and extend partially into the central bore 136 of the shaft 114. Portions of the arms 164 are positioned between the jaws 138 to push the jaws 138 apart from each other. Ends of the arms 164 are positioned within apertures in the jaws 138 such that the arms 164 do not extend radially outward beyond the jaws 138. In other embodiments, the collet 110 may include other suitable biasing members.

The collar 146 fits over the jaws 138 and the shaft 114. The collar 146 includes an inner surface 147 and an outer surface 148. The inner surface 147 includes a threaded portion 150 and a sloped portion 152. The threaded portion 150 is located adjacent a first end 154 of the collar 146. The sloped portion 152 is located adjacent a second end 158 of the collar 146. The threaded portion 150 of the collar 146 engages the threaded portion 130 of the shaft 114. As such, the collar 146 can be rotated to move the collar 146 along the shaft 114. The sloped portion 152 is defined by a diameter of the inner surface 147 that gradually tapers (i.e., reduces) as the inner surface 147 extends away from the threaded portion 150 toward the second end 158. The sloped portion 152 engages the outer surfaces 145 of the jaws 138 to force the jaws 138 radially inward. In the illustrated embodiment, the outer surface 148 is a knurled surface. In other embodiments, the outer surface 148 may have other contouring to facilitate gripping and manipulating the collar 146.

In operation, the collar 146 is moved (e.g., rotated) relative to the shaft 114 in a first direction to move the collar 146 away from the head 118. In this position, the jaws 138 can spread apart (e.g., due the bias of the biasing member 160) to receive a tapping tool. When the jaws 138 are sufficiently spread apart, an end of the tapping tool is inserted between the jaws 138. The collar 146 is then rotated in a second direction to move the collar 146 toward the head 118. As the collar 146 moves toward the head 118, the sloped portion 152 of the collar 146 engages the tapered outer surfaces 145 of the jaws 138, pushing the jaws 138 toward each other. The jaws 138 thereby clamp the tapping tool between them.

As shown in FIGS. 10A-11B, the illustrated collet 110 can receive tapping tools 111, 112 of different sizes (e.g., diameters). For example, the collet 110 can receive tapping tools 111, 112 with shank diameters ranging from 2.0 mm (0.08 inches) to 7.5 mm (0.3 inches). Such tapping tools 111, 112 may have a tap size range of 4-36 to ½-20 or M3X0.6 to M12X1.25. In other embodiments, the collet 110 may also be able to receive relatively larger or relatively larger tapping tools.

In operation, the handle assembly 10 (FIGS. 1-3) is configured to alternately couple to the die 32 (FIG. 6) and the tap assembly 36 (e.g., the collet 110 and/or the tapping tools 111, 112) (FIGS. 7A-11B). In particular, the non-circular aperture 20 of the handle assembly 10 can alternately receive the die 32 and the head 118 of the collet 110. When received in the non-circular aperture 20, the retainers 56 engage the receiving portions 104 of the die 32 or the receiving portions 126 of head 118. The retainers 56, thereby, releasably secure the die 32 and the tap assembly 36 to the handle assembly 10. The die 32 and the tap assembly 36 can be inserted into and removed from the non-circular aperture 20 without the use of tools (e.g., a screwdriver, a hex wrench, etc.) and without disassembling the handle assembly 10. More particularly, the retainers 56 provide a spring-biased friction fit that allow a user to push the die 32 and the tap assembly 36 into or pull the die 32 and the tap assembly 36 out of the non-circular aperture 20 by providing enough force to overcome the biasing members 78 of the retainers 56. Once assembled, the handle assembly 10 can rotate the die 32 or the tap assembly 36 to form threads on a corresponding workpiece.

Although the handle assembly 10, die 32, and tap assembly 36 are described with reference to specific embodiments, variations and modifications exist within the spirit and scope of the invention. Various features and advantages of the disclosure are set forth in the following claims.

The invention claimed is:

1. A handle assembly to receive a collet of a tap assembly or a die, the handle assembly comprising:
    a body defining a non-circular aperture and a channel extending circumferentially around the non-circular aperture, and an axis of rotation that extends through the non-circular aperture, the non-circular aperture configured to receive the collet of the tap assembly or the die;
    a grip extending radially from the body;
    a retainer disposed in the channel, the retainer including an engagement member and a biasing member that biases the engagement member toward the axis of rotation, the retainer configured to releasably secure the collet of the tap assembly or the die within the non-circular aperture; and
    a cover coupled to the body and covering the channel.

2. The handle assembly of claim 1, wherein the retainer is one of a plurality of retainers arranged radially about the axis of rotation.

3. The handle assembly of claim 1, wherein the engagement member includes a head configured to engage the collet of the tap assembly or the die, an engagement post coupled to the biasing member, and a flange between the head and engagement post.

4. The handle assembly of claim 3, wherein the head is semi-spherical.

5. The handle assembly of claim 1, wherein the engagement member is spherical.

6. The handle assembly of claim 1, wherein the retainer is configured to engage a recess formed in an outer surface of the collet or a recess formed in an outer surface of the die.

7. The handle assembly of claim 1, wherein the retainer is configured to engage a through-hole that extends through the collet and is configured to receive a handle rod.

8. The handle assembly of claim 1, wherein the grip is a first grip, and further comprising a second grip extending radially from the body on a diametrically opposite side from the first grip.

9. The handle assembly of claim 1, wherein the non-circular aperture has a polygonal geometry.

10. A handle assembly to receive a collet of a tap assembly or a die, the handle assembly comprising: a body defining an aperture and an axis of rotation that extends through the aperture, the aperture configured to receive the collet of the tap assembly or the die, the body having an outer perimeter; a grip extending radially from the outer perimeter of the body; and a retainer disposed in the body, the retainer including a first end and a second end opposite the first end, the first end movable into the aperture to releasably secure the collet of the tap assembly or the die within the aperture, both the first end and the second end being located within the outer perimeter of the body, wherein the retainer includes an engagement member defining the first end and a biasing member defining the second end.

11. The handle assembly of claim 10, wherein the engagement member includes a head, an engagement post extending toward the second end, and a flange between the head and engagement post.

12. The handle assembly of claim 10, wherein the aperture has a polygonal geometry.

* * * * *